(12) United States Patent
Fine (10) Patent No.: US 9,389,663 B2
(45) Date of Patent: Jul. 12, 2016

(54) DETECTION OF MALWARE THROUGH VOLTAGE MEASUREMENTS OF FIELD PROGRAMMABLE GATE ARRAY

(71) Applicant: Empire Technology Development LLC, Wilmington, DE (US)

(72) Inventor: Kevin S. Fine, Yverdon-les-Bains (CH)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/386,300

(22) PCT Filed: Jan. 22, 2014

(86) PCT No.: PCT/US2014/012578
§ 371 (c)(1),
(2) Date: Sep. 18, 2014

(87) PCT Pub. No.: WO2015/112140
PCT Pub. Date: Jul. 30, 2015

(65) Prior Publication Data
US 2015/0301570 A1    Oct. 22, 2015

(51) Int. Cl.
*G06F 12/14*     (2006.01)
*G08B 29/00*    (2006.01)
*G06F 1/28*       (2006.01)
*G06F 21/56*     (2013.01)
*G06F 21/76*     (2013.01)
*H04L 29/06*    (2006.01)
*G06F 21/70*     (2013.01)

(52) U.S. Cl.
CPC *G06F 1/28* (2013.01); *G06F 21/56* (2013.01); *G06F 21/566* (2013.01); *G06F 21/76* (2013.01); *G06F 21/70* (2013.01); *G06F 2221/034* (2013.01); *H04L 63/1416* (2013.01)

(58) Field of Classification Search
CPC ...... H04L 63/1416; G06F 21/70; G06F 21/56
USPC ...................... 726/22, 34; 713/188
See application file for complete search history.

(56) References Cited

U.S. PATENT DOCUMENTS

| 7,590,956 | B1 | 9/2009 | Trimberger | |
|---|---|---|---|---|
| 8,566,940 | B1 | 10/2013 | Rudelic | |
| 8,892,903 | B1 * | 11/2014 | Trimberger | H04L 9/00 713/189 |
| 2006/0195904 | A1 * | 8/2006 | Williams | G06F 21/564 726/24 |
| 2006/0294589 | A1 | 12/2006 | Achanta et al. | |

(Continued)

OTHER PUBLICATIONS

"Electrical resistivity tomography," accessed at http://web.archive.org/web/20130828033827/http://en.wikipedia.org/wiki/Electrical_resistivity_tomography, last modified on Jun. 30, 2013, pp. 1-4.

(Continued)

*Primary Examiner* — Aravind Moorthy
(74) *Attorney, Agent, or Firm* — Turk IP Law, LLC (57) ABSTRACT

Technologies are generally described to detect malware on field programmable gate arrays (FPGAs). In some examples, a power map of an FPGA executing coprocessors may be created by determining voltages associated with distinct areas within the FPGA. The power map may then be compared with expected activity information associated with the executing coprocessors to determine whether any mismatches occur, such as detected power usage where no power usage is expected. Mismatches may indicate the presence of malware executing on the FPGA.

18 Claims, 8 Drawing Sheets

(56) References Cited

U.S. PATENT DOCUMENTS

| | | | |
|---|---|---|---|
| 2010/0313270 A1 | 12/2010 | Kim et al. | |
| 2011/0314548 A1 | 12/2011 | Yoo | |
| 2013/0232347 A1* | 9/2013 | Pinto | H03K 19/0016 713/300 |
| 2014/0225624 A1* | 8/2014 | Chakrabarty | G01R 31/318558 324/509 |
| 2015/0039922 A1* | 2/2015 | Chalhoub | G06F 1/3234 713/323 |

OTHER PUBLICATIONS

"The ultra-low-power programmable solution," accessed at http://web.archive.org/web/20130127010254/http://www.actel.com/products/IGLOO, accessed on Sep. 2, 2014, pp. 1-3.

"Virtex-5 FPGA System Monitor," User Guide, UG192 (v1.7.1), pp. 1-66 (Feb. 3, 2011).

Bajarin, T., "ARM vs Intel: how the processor wars will benefit consumers," accessed at http://web.archive.org/web/20130923062030/http://techland.time.com/2012/07/16/arm-vs-intel-how-the-processor-wars-will-benefit-consumers-most, posted on Jul. 16, 2012, pp. 1-12.

Beaumont, M., et al., "Hardware Trojans—Prevention, Detection, Countermeasures," A Literature Review, No. DSTO-TN-1012, Defence Science and Technology Organisation Edinburgh (Australia), Command Control Communications and Intelligence Div., pp. 1-38 (2011).

Belhadj, H., et al., "Power-Aware FPGA Design," Actel ©, pp. 1-28 (Feb. 2009).

Chen, C., et al., "Nano-Electro-Mechanical relays for FPGA routing: Experimental demonstration and a design technique," Design, Automation & Test in Europe Conference & Exhibition, pp. 1361-1366 (Mar. 12-16, 2012).

Compton, K., and Hauck, S., "Reconfigurable computing: a survey of systems and software," ACM Computing Surveys, vol. 34, No. 2, pp. 171-210 (Jun. 2002).

Grover, N., and Soni, M.K., "Reduction of power consumption in FPGAs—an overview," I.J. Information Eng. and Electronic Business, vol. 4, No. 5, pp. 50-69 (Oct. 2012).

Hadžid, I., et al., "FPGA viruses," Technical Reports (CIS), Department of Computer & Information Science, pp. 13 (1999).

International search report and written opinion for PCT application No. PCT/US2014/012578 mailed on May 2, 2014.

Masle, A.L., et al., "Constant power reconfigurable computing," International Conf. on Field-Programmable Technology, pp. 32 (2011).

Maxfield, C., "New Xilinx Virtex-7 2000T FPGA provides equivalent of 20 million ASIC gates," accessed at http://www.eetimes.com/document.asp?doc_id=1316816, posted on Oct. 25, 2011, pp. 1-6.

Mohsen, E., "Reducing System Power and Cost with Artix-7 FPGAs," Xilinx, Artix 7, WP423 (v2.2), pp. 1-12 (Jul. 31, 2013).

Moradi, A., "On the Vulnerability of FPGA Bitstream Encryption against Power Analysis Attacks," Proceeding CCS '11 Proceedings of the 18th ACM conference on Computer and communications security, pp. 111-124 (2011).

Shankar, K., "SiliconBlue Technologies," accessed at http://web.archive.org/web/20130217054435/http://en.wikipedia.org/wiki/SiliconBlue_Technologies, last modified on Jan. 10, 2013, pp. 1-4.

Sturton, C., et al., "Defeating UCI: Building stealthy and malicious hardware," 2011 IEEE Symposium on Security and Privacy (SP), IEEE, pp. 64-77 (2011).

Swanson, S., and Taylor, M. B., "GreenDroid: Exploring the next evolution in smartphone application processors," IEEE Communication Magazine, pp. 112-119 (Apr. 2011).

Tofel, K. C., "ARM vs. Intel: just starting? Or already over?," accessed at http://www.businessweek.com/technology/arm-vs-intel-just-starting-or-already-over-11112011.html?track=sticky, posted on Nov. 11, 2011, pp. 1-16.

Tofel, K., "5 biggest losers as smartphone sales surpass PCs," accessed at http://web.archive.org/web/20121215175124/http://gigaom.com/mobile/5-biggest-losers-as-smartphone-sales-surpass-pcs/, posted on Jan. 13, 2011, pp. 1-11.

Tofel, K.C., "Can Nvidia's new Tegra 3 chip boost tablet sales?," accessed at http://web.archive.org/web/20120712050359/http://gigaom.com/mobile/can-nvidias-new-tegra-3-chip-boost-tablet-sales, posted on Nov. 9, 2011, pp. 1-7.

Villasenor, J., and Hutchings, B., "The flexibility of configurable computing," IEEE Signal Processing Magazine, vol. 15, No. 5, pp. 67-84 (Sep. 1998).

* cited by examiner

DETECTION OF MALWARE THROUGH VOLTAGE MEASUREMENTS OF FIELD PROGRAMMABLE GATE ARRAY

CROSS-REFERENCE TO RELATED APPLICATION

This Application is the National Stage filing under 35 U.S.C. §371 of PCT Application Ser. No. PCT/US2014/012578 filed on Jan. 22, 2014. The PCT application is hereby incorporated by reference in its entirety.

BACKGROUND

Unless otherwise indicated herein, the materials described in this section are not prior art to the claims in this application and are not admitted to be prior art by inclusion in this section.

Hardware accelerators, also known as coprocessors, may be many times more energy efficient than general purpose processors when performing particular tasks, and thus may be well-suited to mobile devices and other devices where reducing power consumption may be desirable. Coprocessors may be implemented using fixed logic or reprogrammable field programmable gate arrays (FPGAs). For mobile devices, FPGA-implemented coprocessors may be preferred over fixed-logic coprocessors because the same hardware (FPGA) can be reprogrammed with different coprocessors as different tasks arise.

SUMMARY

The present disclosure generally describes techniques to detect malware through voltage measurements of field programmable gate array (FPGA).

According to some examples, a method is provided to detect a malware at an FPGA through voltage measurements of the FPGA. The method may include initiating a scan of the FPGA for the malware, measuring voltages in distinct areas within the FPGA, creating a power map from the voltages, and executing the scan by comparing the power map to an expected activity information associated with the FPGA.

According to other examples, a computing device including a processor is provided to detect a malware at an FPGA through voltage measurements of the FPGA. The computing device may include a memory configured to store instructions and a controller coupled to the memory and configured to execute a malware detection module in conjunction with the stored instructions. The malware detection module may be configured to initiate a scan of the FPGA for the malware, measure voltages in distinct areas within the FPGA, create a power map from the voltages, retrieve an expected activity information associated with the FPGA from a configuration controller, and execute the scan based on a comparison of the power map to the expected activity information. An existing sensor on the FPGA and/or a new sensor positioned adjacent to the FPGA may be used to measure the voltages.

According to some examples, a computer readable medium may store instructions to detect a malware at an FPGA through voltage measurements of the FPGA. The instructions may cause a method to be performed when executed, the method may include initiating a scan of the FPGA for the malware based on a condition of the FPGA that includes an inactivity of the FPGA and/or a partial inactivity of the FPGA and measuring voltages in distinct areas within the FPGA using an existing sensor on the FPGA and/or a new sensor positioned adjacent to the FPGA. The method may further include creating a power map from the voltages, retrieving an expected activity information associated with the FPGA from a configuration controller, and executing the scan by comparing the power map to the expected activity information.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to detection of a malware at an FPGA through voltage measurements of the FPGA.

Briefly stated, technologies are generally described to detect malware on field programmable gate arrays (FPGAs).

In some examples, a power map of an FPGA executing coprocessors may be created by determining voltages associated with distinct areas within the FPGA. The power map may then be compared with expected activity information associated with the executing coprocessors to determine whether any mismatches occur, such as detected power usage where no power usage is expected. Mismatches may indicate the presence of malware executing on the FPGA.

Figure 1:
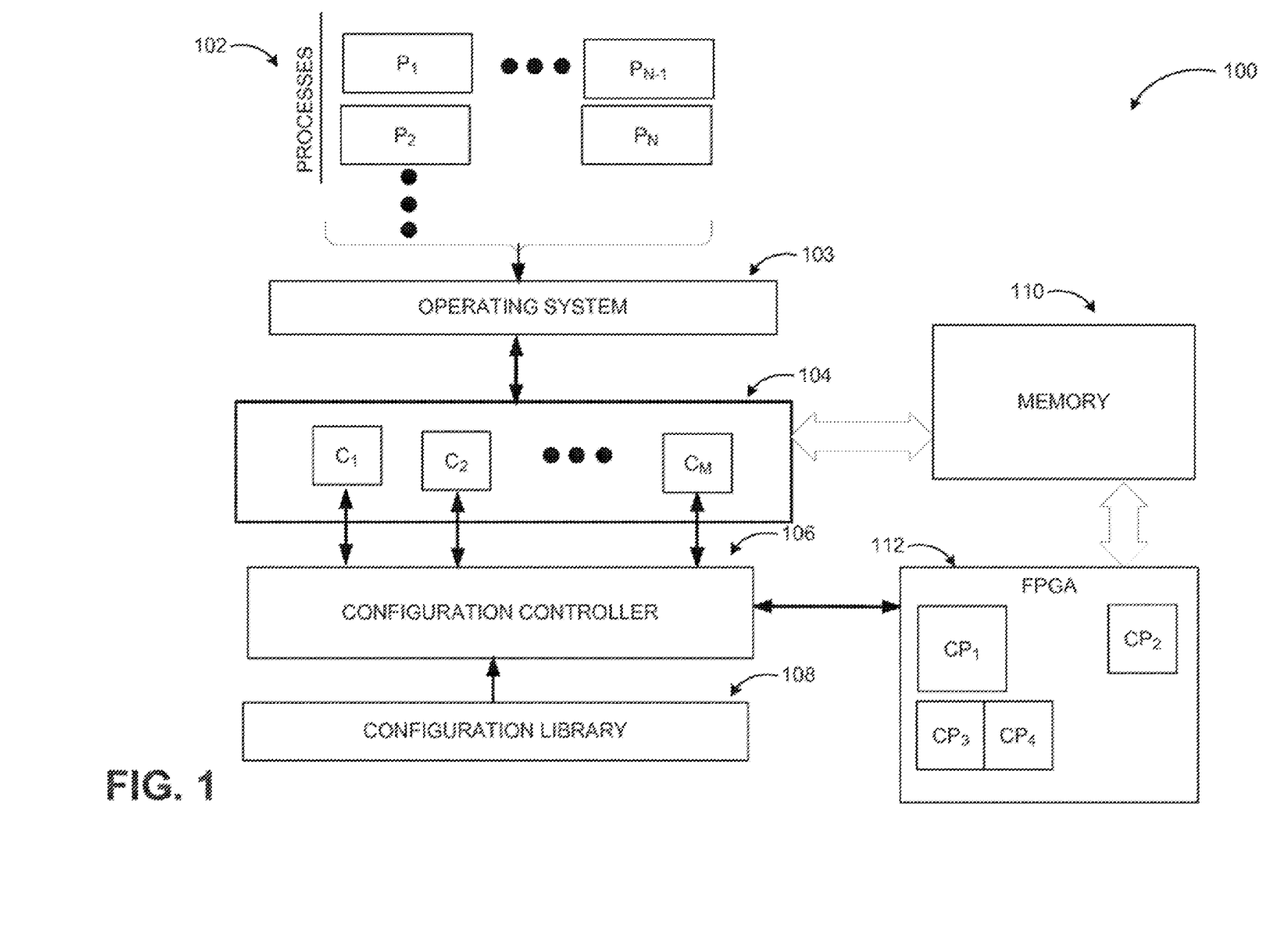
FIG. 1 illustrates an example schematic of a field programmable gate array (FPGA) deployed in a configurable environment.

FIG. 1 illustrates an example schematic of a field programmable gate array (FPGA) deployed in a configurable environment, arranged in accordance with at least some embodiments described herein.

As shown in a diagram 100, a computing platform may include an operating system (OS) 103 configured to schedule one or more processes 102 for execution on one or more different compute cores 104. The processes may be associated with one or more applications, and the computing platform may be any suitable computing platform, such as a desktop computer, a server, a mobile device, or similar devices. The cores 104 may be coupled to a system memory 110 via a system memory bus. The system memory 110 may also be coupled to an FPGA 112. The FPGA 112 may be configured to implement coprocessors designed to increase computing efficiency as described above, and in some embodiments may have multiple logic cells or digital units, which may be combined to form circuits and/or processors with various functionalities. A configuration controller 106 may be configured to load one or more coprocessors (e.g., as one or more configware or configuration files, described in more detail below) onto the FPGA 112. In some embodiments, each coprocessor loaded on the FPGA 112 may be associated with one or more of the processes 102 executing on the cores 104. In some embodiments, individual cores may transfer part of their computing loads to an associated coprocessor on the FPGA 112 by, for example, communicating data via the system memory 110. The coprocessors, which may be configured to perform intensive calculations more efficiently than the cores 104, may then place calculation results back into the system memory 110 for use by the processes 102. This may increase the computing efficiency and speed of execution of the processes 102.

In some embodiments, the configuration controller 106 may be configured to load and unload coprocessors onto and from the FPGA 112 based on one or more configuration programs or configware stored in a configware library 108, which may be stored in memory. The configware may include descriptor files for coprocessors to be loaded onto the FPGA 112. For example, the descriptor files in the configware may list the various digital elements and inputs/outputs to be connected on the FPGA 112 in order to load a particular coprocessor onto the FPGA 112. In some embodiments, the descriptor files may take the form of hardware descriptor language (HDL) files, which may be compiled to provide netlist files. The netlist files in turn may include detailed lists of connections and elements of the coprocessor circuits. Formats other than HDL may also be used to implement an FPGA according to various embodiments. In some embodiments, the configware may also (or instead) include binary files corresponding to coprocessors, for example, compiled from the appropriate descriptor files.

As applications associated with coprocessors become more widespread, individual applications may include both software modules and associated configware that describe coprocessors. These configware may come in different versions suitable for different hardware types, and may be updated periodically or occasionally. In some embodiments, different configware versions may be downloadable from web servers, similar to applications. This may introduce new vulnerabilities, because the downloadable configware may be compromised with malware. Upon downloading and implementation of a coprocessor in an FPGA, the malicious configware may operate from inside the FPGA, hidden from the view of (eluding detection by) virus detection applications executing on device compute cores. Malicious configware implemented in FPGA hardware may be as or more dangerous than computer viruses, because the configware can actually physically damage the FPGA hardware. For example, malware may cause the formation of short-circuited electrical circuits that can destroy the FPGA or even the device housing the FPGA.

To address this issue, malware sensing may be implemented on the FPGA as described herein. In some embodiments, power usage in various regions of an FPGA may be measured. The measured power usage may then be compared with the expected power usage of known coprocessors implemented on the FPGA. A mismatch between the measured power usage and the expected power usage may indicate the presence of malware operating on the FPGA.

Figure 2:
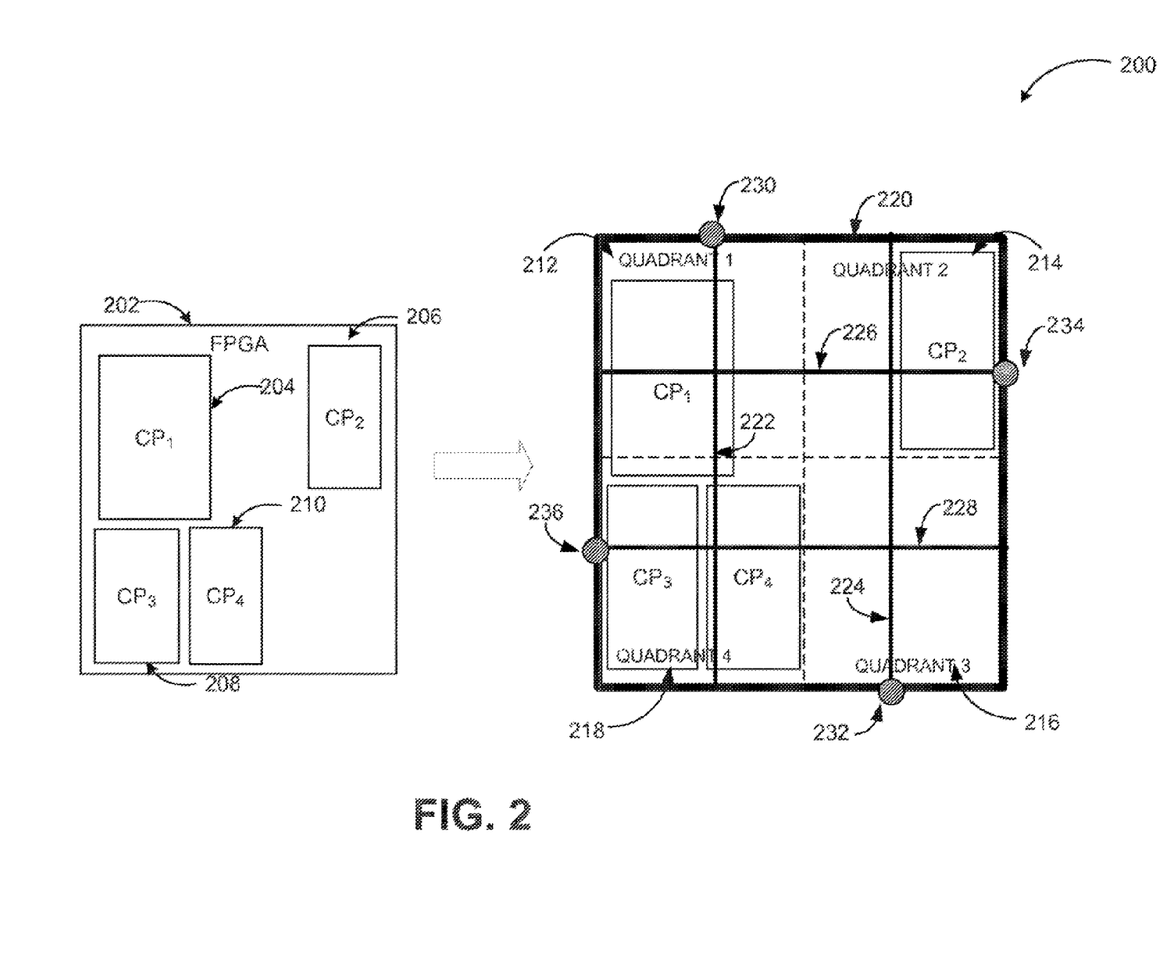
FIG. 2 illustrates an example of measuring power usage of coprocessors within a FPGA.

FIG. 2 illustrates an example of measuring power usage of coprocessors within a FPGA, arranged in accordance with at least some embodiments described herein.

As shown in a diagram 200, an FPGA 202 (similar to the FPGA 112 in FIG. 1) may implement one or more coprocessors. For example, the FPGA 202 may implement a first coprocessor $CP_1$ 204, a second coprocessor $CP_2$ 206, a third coprocessor $CP_3$ 208, and a fourth coprocessor $CP_4$ 210. The FPGA 202 further includes a power distribution network formed of multiple power distribution traces, depicted as gray lines, and a ground plane layer, which is not shown. For example, the power distribution network may include an outer distribution trace 220 electrically coupled to inner traces 222, 224, 226, and 228. While four inner traces are depicted in the diagram 200, an FPGA power distribution network may include more or fewer inner traces.

The FPGA power distribution network may provide power in the form of current and voltage to the various digital elements in the FPGA 202. In some embodiments, an FPGA power distribution network may be used to divide an FPGA into different, distinct areas or regions (interchangeably referred to herein), based on the power distribution traces used to power each area. For example, in the diagram 200, the area of FPGA 202 supplied by the traces 222 and 226 may be denoted as quadrant 1 212 and the area supplied by the traces 224 and 226 may be denoted as quadrant 2 214. The area supplied by the traces 224 and 228 may be denoted as quadrant 3 216 and the area supplied by the traces 222 and 228 may be denoted as quadrant 4 218. Of course, in other embodiments an FPGA may be divided into more than four distinct areas or fewer than four distinct areas, based on the power distribution traces of interest.

Each coprocessor loaded on the FPGA 202 may receive power for its constituent digital elements from the power distribution traces that power its area of the FPGA. For example, the first coprocessor $CP_1$ 204 lies within the quadrant 1 212 and the quadrant 4 218, and may receive power from the traces that pass through those quadrants (i.e., traces 222, 226, and 228). The second coprocessor $CP_2$ 206 lies within the quadrant 2 214, and may receive power from the traces 224 and 226. The third coprocessor $CP_3$ 208 and the fourth coprocessor $CP_4$ 210 both lie within the quadrant 4 218, and may receive power from the traces 222 and 228.

The power usages associated with the different FPGA areas may be determined by measuring voltages and/or currents at certain locations on the FPGA power distribution network. In the FPGA 202, four sensors 230, 232, 234, and 236, each placed or positioned at the periphery of the FPGA 202 and at a junction of the outer trace 220 and one of the inner traces 222-228, may be sufficient to determine and/or infer the voltages, currents, and/or power usages associated with the four quadrants. The sensors 230-236 may be voltage and/or current sensors, and may be preexisting sensors on the FPGA 202 or new sensors positioned adjacent to the FPGA 202. In some embodiments, one or more of the sensors 230-236 may include a specialized coprocessor loaded onto the FPGA 202.

Figure 3:
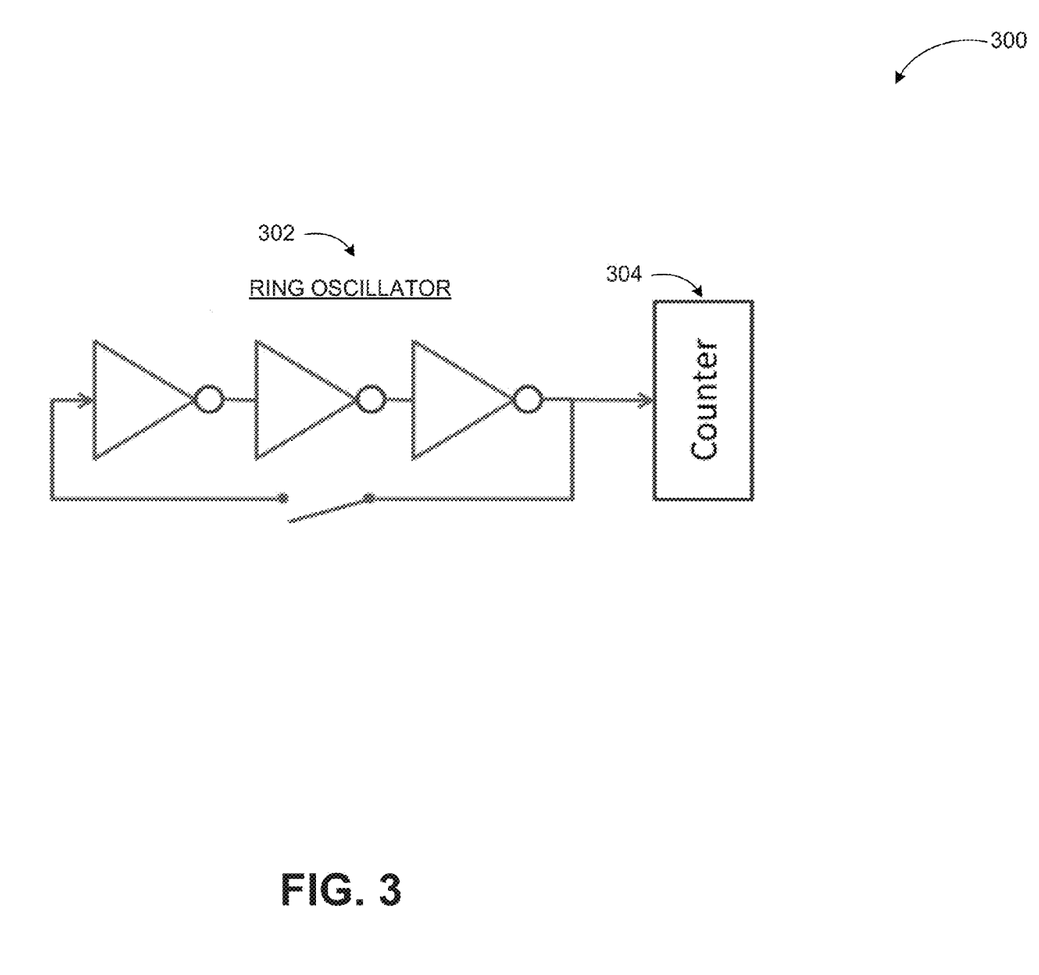
FIG. 3 illustrates an example ring oscillator suitable to measure power usage of coprocessors within a FPGA.

FIG. 3 illustrates an example ring oscillator suitable to measure power usage of coprocessors within a FPGA, arranged in accordance with at least some embodiments described herein.

As described above in conjunction with FIG. 2, a sensor used to measure voltage and/or current in an FPGA may include a specialized coprocessor loaded onto the FPGA in some embodiments. Such coprocessors may include a ring oscillator 302, as shown in a diagram 300. The ring oscillator 302 may include an odd number of inverters connected in a feedback chain. The final output of the chain is the logical inverse or NOT of an input into the first inverter, and is asserted a finite amount of time after the input enters the first inverter. Since the final output of the chain is connected to the input into the first inverter, the feedback chain may cause the ring oscillator 302 to oscillate. The oscillation frequency of the ring oscillator 302 may be sensitive to the power voltage supplied to the inverters in the ring oscillator 302. As a result, a counter 304 may be coupled to the final output of the ring oscillator 302 to measure the oscillation period of the ring oscillator 302 as a function of time (e.g., by counting the transitions of the final output as a function of time). The measured oscillation-period-versus-time characteristic may then be converted into a voltage-versus-time characteristic, and since voltage is directly related to power, the ring oscillator 302 may be used to measure power variations of an FPGA when implemented as a coprocessor.

Figure 4:
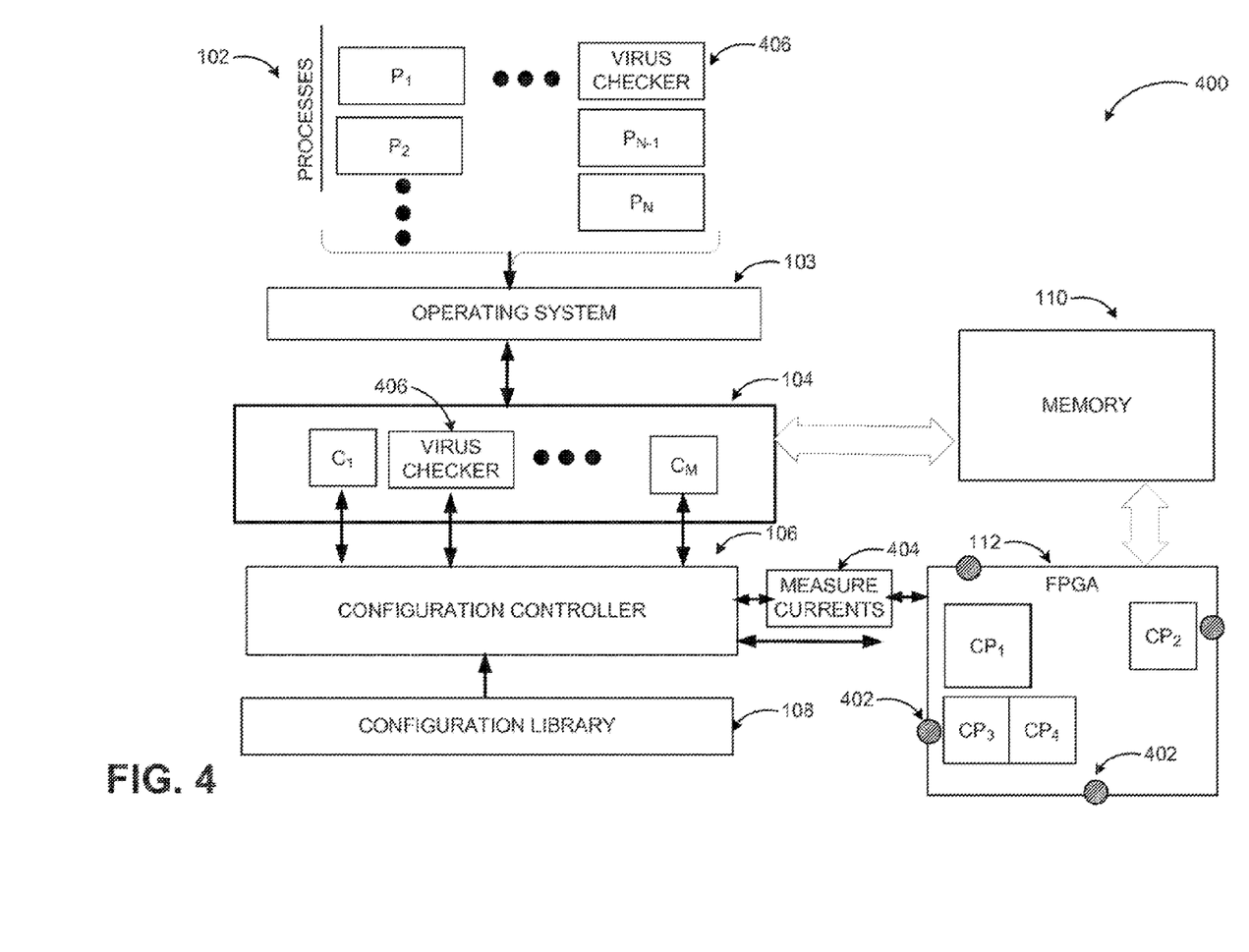
FIG. 4 illustrates an example of measuring power usage at a FPGA and comparing to expected configuration information to scan for malware at the FPGA.

FIG. 4 illustrates an example of measuring power usage at a FPGA and comparing to expected configuration information to scan for malware at the FPGA, arranged in accordance with at least some embodiments described herein.

As depicted in a diagram 400, a computing platform may include components to detect for malware at the FPGA 112. The computing platform in the diagram 400 may include components similar to the one shown in the diagram 100, with similarly-numbered elements behaving similarly. One or more sensors 402 placed or positioned near the periphery of the FPGA 112 may be configured to measure the voltage, current, and/or power consumption associated with nearby power distribution traces, as described above in conjunction with FIG. 2. The sensors 402 may include preexisting sensors on the FPGA 112, external sensors mounted around the FPGA 112, and/or measurement coprocessors loaded on the FPGA 112. In some embodiments, a measurement coprocessor may include a ring oscillator as described above in FIG. 3. Power usage data such as voltage, current, and/or power consumption measured by the sensors 402 may then be transmitted to the configuration controller 106.

An operating system of the computing platform in the diagram 400 may also schedule a virus checker process 406 for execution on the cores 104. In some embodiments, the virus checker process 406 may be part of a malware detection application or module, and may be configured to scan the FPGA 112 for the presence of malware. The virus checker process 406 may receive the power usage data measured by the sensors 402 from the configuration controller 106. Using the power usage data and knowledge of the locations around the FPGA 112 where the data was collected, the virus checker process 406 may be able to determine (a) the areas of the FPGA 112 consuming power, and (b) the amount of power consumed by the different FPGA areas. The virus checker process 406 may then use the determined information to generate a power map of the FPGA 112.

The virus checker process 406 may also receive information about currently loaded coprocessors on the FPGA 112 from the configuration controller 106. The configuration controller 106, being responsible for loading and unloading coprocessors onto and from the FPGA 112, may have knowledge of the coprocessors that are currently loaded on the FPGA 112 and their locations. For example, the configuration controller 106 may know that $CP_1$ is located in the first quadrant and the fourth quadrant, $CP_2$ is located in the second quadrant, and $CP_3$ and $CP_4$ both are located in the fourth quadrant. Moreover, the configuration controller 106 may also know whether coprocessors are active or inactive. For example, the configuration controller 106 may know that $CP_2$, while loaded in the FPGA 112, is currently inactive.

The configuration controller 106 and/or the virus checker process 406 may also have knowledge of the expected power consumption for each of the known coprocessors loaded onto the FPGA 112. The expected power consumption for a given coprocessor may be based on its activity state. For example, an active coprocessor may have a relatively large power consumption, whereas an inactive coprocessor may have a relatively low or even zero power consumption. The expected power consumption for a coprocessor may also be based on its power consumption history. For example, an active coprocessor may be expected to consume about as much power as it has consumed while active in the past.

The virus checker process 406 may then compare the generated power map of the FPGA 112 to the expected coprocessor power consumption information received from the configuration controller 106 to determine whether power consumption discrepancies exist. For example, suppose that the configuration controller 106 indicates that only $CP_2$ is loaded in the second quadrant and that $CP_2$ is currently inactive, but the FPGA power map indicates that power consumption in the second quadrant is relatively high. The virus checker process 406 may then conclude based on the power consumption mismatch that malware is present in the second quadrant, either within $CP_2$ or in a separate coprocessor unknown to the configuration controller 106. The virus checker process 406 may also conclude that malware is present when the configuration controller 106 indicates that a particular FPGA area does not have any coprocessors loaded but the power map indicates that power consumption in that area is high. In some embodiments, the virus checker process 406 may indicate that malware is present in a coprocessor loaded on the FPGA 112 in response to determining that the coprocessor's actual power consumption exceeds some predetermined threshold. The predetermined threshold may be based on previous power consumption measurements of the coprocessor, or may be based on malware power consumption characteristics from a data store containing malware/virus characteristics.

In response to determining that malware is present on the FPGA 112, the virus checker process 406 may cause the malware to be quarantined or removed. The virus checker process 406 may perform the malware quarantine/removal itself, or may execute a specialized process to perform the malware quarantine/removal. In some embodiments, virus checker process 406 may cause a message indicating the presence of the malware to be transmitted to the user(s) of the computing platform. The virus checker process 406 may also be configured to cause a report associated with the detected malware to be transmitted to the virus checker's manufacturer or any other suitable entity.

Figure 5:
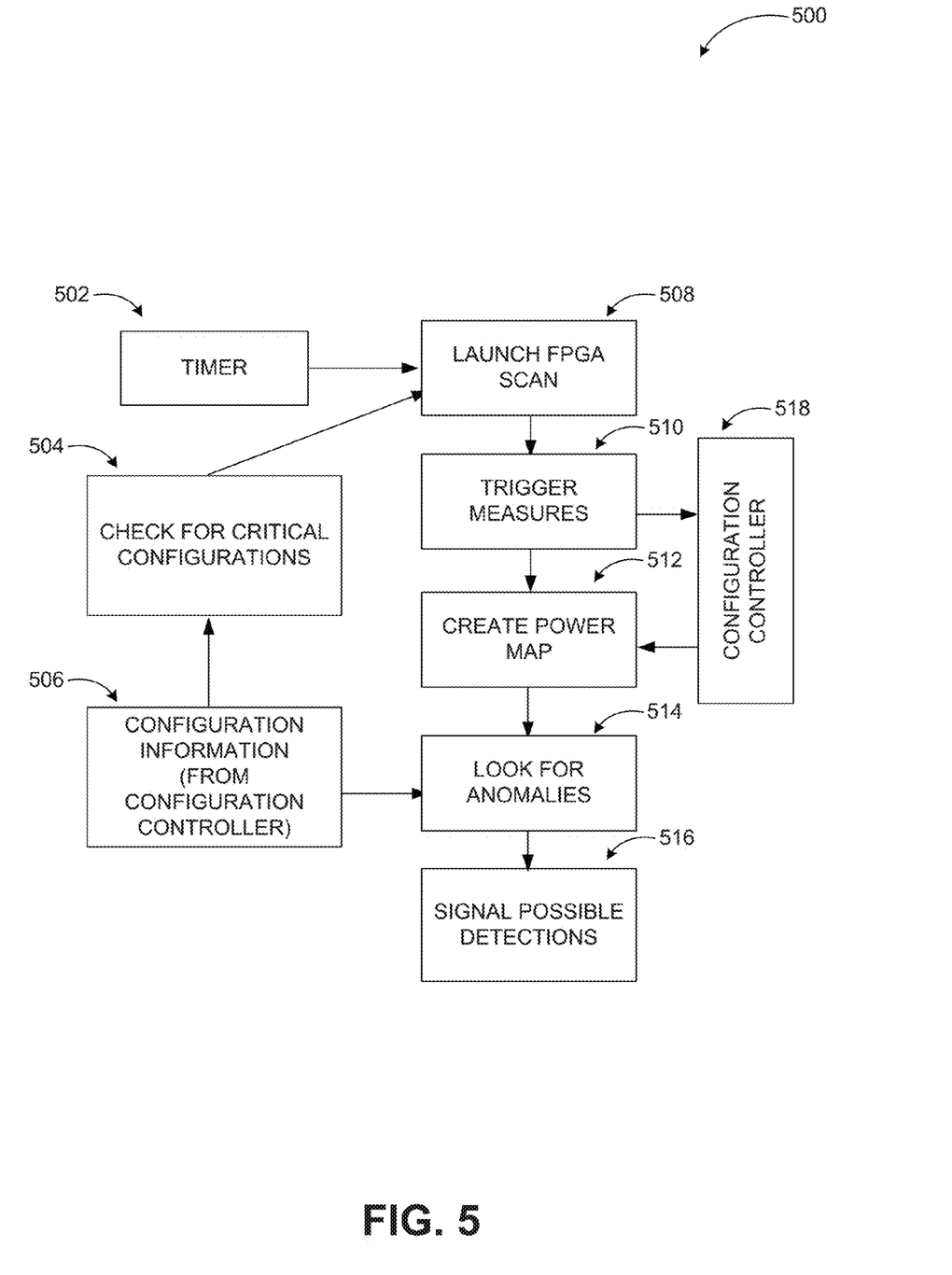
FIG. 5 illustrates an example flow diagram of malware scanning based on power usage measurements at the FPGA.

FIG. 5 illustrates an example flow of malware scanning based on power usage measurements at the FPGA, arranged in accordance with at least some embodiments described herein.

According to a diagram 500, malware scanning based on power usage measurements at the FPGA may begin with a timer 502 indicating that an FPGA malware scan is to be performed. The malware scan may be scheduled by the timer 502 to be performed at predefined time intervals or at dynamic time intervals determined based on user input, computing platform operation, FPGA operation, and/or coprocessor operation. In some embodiments, the malware scan process may begin with an operation 504, "CHECK FOR CRITICAL CONFIGS", where a particular (also referred to as 'critical') configuration of coprocessors on the FPGA may trigger the malware scan instead of the timer 502. For example, the malware scan may be triggered based on a coprocessor loading on the FPGA, a coprocessor unloading from the FPGA, a coprocessor activation or deactivation, or any other suitable FPGA coprocessor configuration criteria. In some embodiments, configuration information 506 associated with the critical configurations may be received from a configuration controller 518 (e.g., the configuration controller 106).

At an operation 508, "LAUNCH FPGA SCAN", a malware scanning process (e.g., the virus checker process 406) may launch the FPGA malware scan. Upon launching of the FPGA scan, the configuration controller 518 may trigger power usage measurements of the FPGA (510) and create a power map (512). For example, the malware scanning process may trigger measurements of voltage, current, and/or power consumption from one or more sensors associated with the FPGA (e.g., the sensors 402).

At an operation 514, "LOOK FOR ANOMALIES", the malware scanning process may compare the power map with known coprocessor configuration information to determine if power consumption anomalies exist, as described above. Such anomalies may include an FPGA area consuming power when no coprocessors or only inactive coprocessors are loaded in that area and/or a known coprocessor consuming more power than previously measured. In some embodiments, the known coprocessor configuration information 506 may be received from the configuration controller 518. At an operation 516, "SIGNAL POSSIBLE DETECTIONS", the malware scanning process may provide possible malware detections to a user and/or a malware scanner manufacturer based on the results of the comparison performed at the operation 514. The malware scanning process may also initiate a quarantine or removal of any detected malware.

Figure 6:
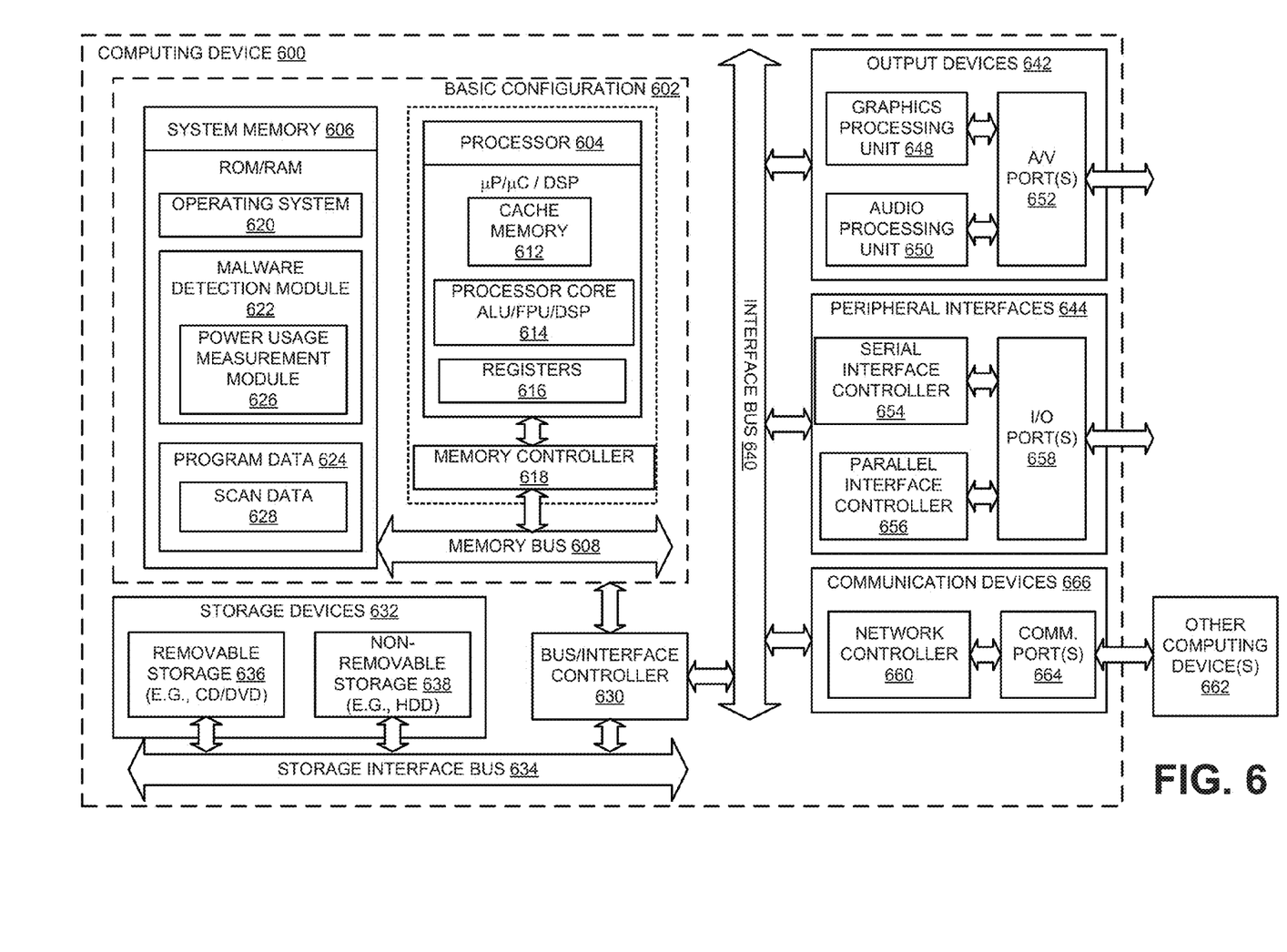
FIG. 6 illustrates a general purpose computing device, which may be used to detect a malware at an FPGA through power usage measurements of the FPGA.

FIG. 6 illustrates a general purpose computing device, which may be used to detect a malware at an FPGA through power usage measurements of the FPGA, arranged in accordance with at least some embodiments described herein.

For example, the computing device 600 may be used to detect malware at an FPGA as described herein. In an example basic configuration 602, the computing device 600 may include one or more processors 604 and a system memory 606. A memory bus 608 may be used to communicate between the processor 604 and the system memory 606. The basic configuration 602 is illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a cache memory 612, a processor core 614, and registers 616. The example processor core 614 may include an arithmetic logic unit (ALU), a floating-point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a malware detection module 622, and program data 624. The malware detection module 622 may include a power usage measurement module 626 to implement malware detection through power usage measurements of an FPGA as described herein. The program data 624 may include, among other data, scan data 628 or the like, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Figure 7:
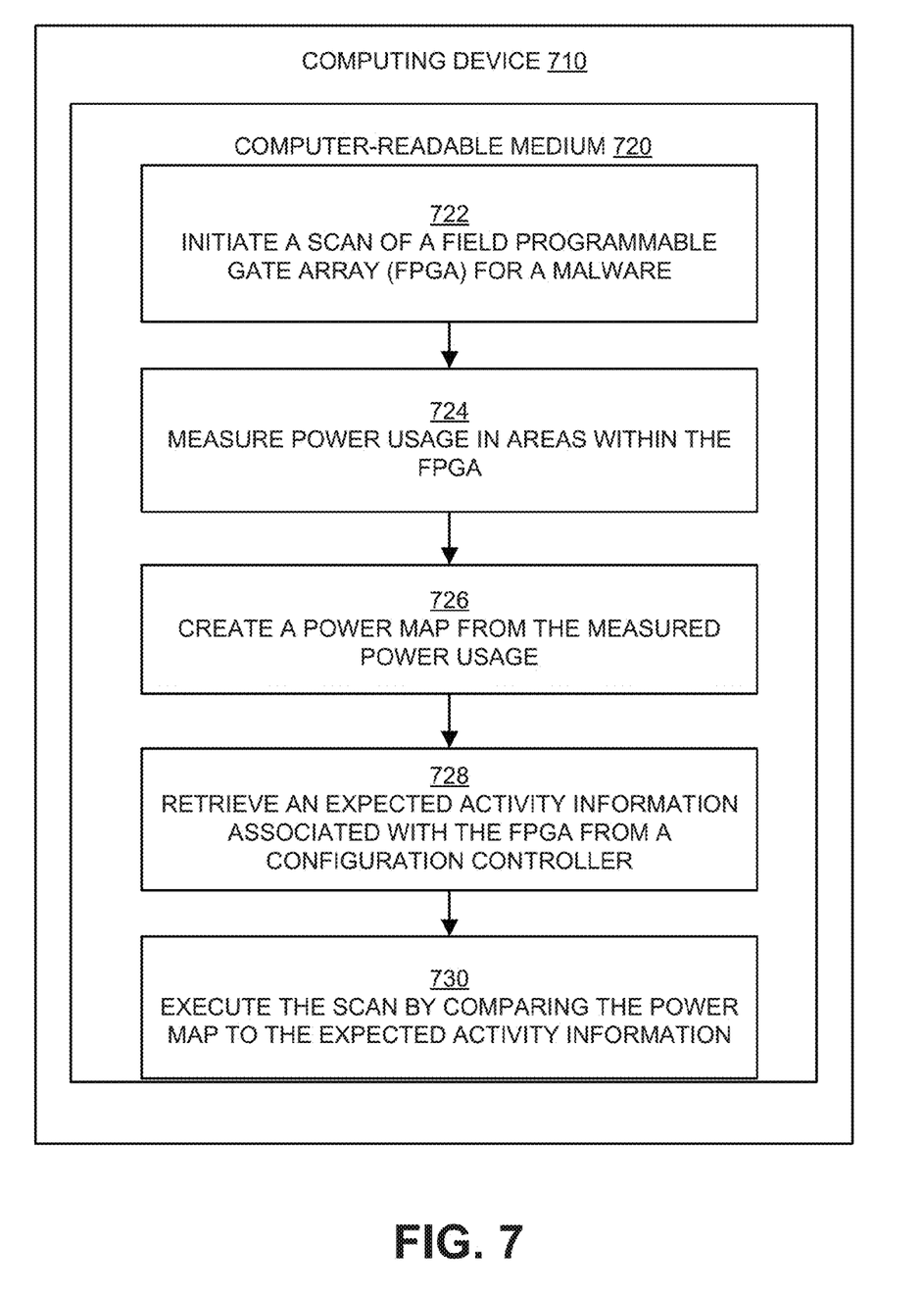
FIG. 7 is a flow diagram illustrating an example method to detect a malware at an FPGA through power usage measurements of the FPGA.

FIG. 7 is a flow diagram illustrating an example method to detect a malware at an FPGA through voltage measurements of the FPGA, arranged in accordance with at least some embodiments described herein.

Example methods may include one or more operations, functions or actions as illustrated by one or more of blocks 722, 724, 726, 728, and/or 730, and may in some embodiments be performed by a computing device such as the computing device 700 in FIG. 7. The operations described in the blocks 722-730 may also be stored as computer-executable instructions in a computer-readable medium such as a computer-readable medium 720 of a computing device 710.

An example process for detecting a malware at an FPGA through voltage measurements of the FPGA may begin with block 722, "INITIATE A SCAN OF A FIELD PROGRAMMABLE GATE ARRAY (FPGA) FOR A MALWARE", where a malware scanning process for an FPGA may be initiated. In some embodiments, the scanning process may be initiated based on a timer (e.g., as described in the operation 502) or a critical coprocessor configuration (e.g., as described in the operation 504).

Block 722 may be followed by block 724, "MEASURE POWER USAGE IN AREAS WITHIN THE FPGA", where one or more sensors associated with the FPGA may be used to measure voltage, current, and/or other power consumption parameters associated with distinct areas of the FPGA, as described above. The measurements may be directly triggered by the malware scanning process or a configuration controller (e.g., the configuration controller 106).

Block 724 may be followed by block 726, "CREATE A POWER MAP FROM THE MEASURED POWER USAGE", where the malware scanning process may use the sensed voltages, currents, and/or other power consumption parameters to create a power map of the FPGA, as described above.

Block 726 may be followed by block 728, "RETRIEVE AN EXPECTED ACTIVITY INFORMATION ASSOCIATED WITH THE FPGA FROM A CONFIGURATION CONTROLLER", where information about known coprocessors loaded on the FPGA may be retrieved from the configuration controller as described above. The information may include the identity and/or location of coprocessors loaded on the FPGA as well as previous power consumption measurements of the loaded coprocessors.

Finally, block 728 may be followed by block 730, "EXECUTE THE SCAN BY COMPARING THE POWER MAP TO THE EXPECTED ACTIVITY INFORMATION", where the malware scanning process compares the power map to the expected activity information to determine whether power consumption discrepancies exist. For example, the malware scanning process may determine whether an FPGA area consumes power when no coprocessors or only inactive coprocessors are loaded in that area and/or whether a known coprocessor is consuming more power than previously measured.

Figure 8:
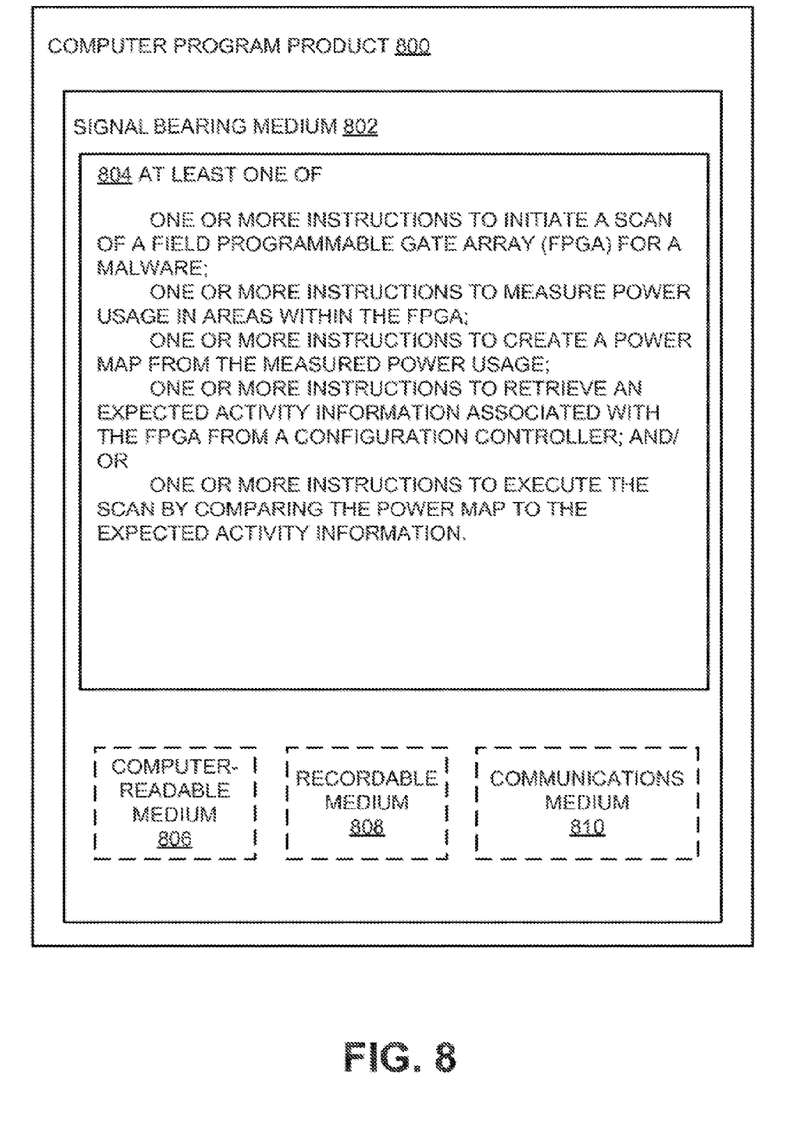
FIG. 8 illustrates a block diagram of an example computer program product to detect a malware at an FPGA through power usage measurements of the FPGA, all arranged in accordance with at least some embodiments described herein.

FIG. 8 illustrates a block diagram of an example computer program product to detect a malware at an FPGA through power usage measurements of the FPGA, arranged in accordance with at least some embodiments described herein.

In some examples, as shown in FIG. 8, a computer program product 800 may include a signal bearing medium 802 that may also include one or more machine readable instructions 804 that, when executed by, for example, a processor may provide the functionality described herein. Thus, for example, referring to the processor 604 in FIG. 6, the malware detection module 622 may undertake one or more of the tasks shown in FIG. 8 in response to the instructions 804 conveyed to the processor 604 by the signal bearing medium 802 to perform actions associated with detecting malware at an FPGA as described herein. Some of those instructions may include, for example, initiating a scan of an FPGA for a malware, measuring power usage in areas within the FPGA, creating a power map from the measured power usage, retrieving an expected activity information associated with the FPGA from a configuration controller, and/or executing the scan by comparing the power map to the expected activity information, according to some embodiments described herein.

In some implementations, the signal bearing medium 802 depicted in FIG. 8 may encompass computer-readable medium 806, such as, but not limited to, a hard disk drive, a solid state drive, a Compact Disc (CD), a Digital Versatile Disk (DVD), a digital tape, memory, etc. In some implementations, the signal bearing media 802 may encompass recordable medium 808, such as, but not limited to, memory, read/write (R/W) CDs, R/W DVDs, etc. In some implementations, the signal bearing media 802 may encompass communications medium 810, such as, but not limited to, a digital and/or an analog communication medium (e.g., a fiber optic cable, a waveguide, a wired communications link, a wireless communication link, etc.). Thus, for example, the computer program product 800 may be conveyed to one or more modules of the processor 604 by an RF signal bearing medium, where the signal bearing media 802 is conveyed by the wireless communications medium 810 (e.g., a wireless communications medium conforming with the IEEE 802.11 standard).

According to some examples, a method to detect a malware at a field programmable gate array (FPGA) through voltage measurements of the FPGA may include initiating a scan of the FPGA for the malware, measuring voltages in distinct areas within the FPGA, creating a power map from the voltages, and executing the scan by comparing the power map to an expected activity information associated with the FPGA.

According to some embodiments, the method may further include using an existing sensor on the FPGA and/or a new sensor positioned adjacent to the FPGA to measure the voltages. The method may further include initiating the scan based on a condition of the FPGA that includes an inactivity of the FPGA and/or a partial inactivity of the FPGA. The method may further include inferring at least one of the voltages from a subset of the voltages, evaluating a power consumption by one of the distinct areas without a coprocessor, and/or evaluating a power consumption by one of the areas with at least one inactive coprocessor.

According to other embodiments, the method may further include evaluating a power consumption exceeding a predetermined threshold by a coprocessor of the FPGA and/or retrieving the predetermined threshold from a data store of prior measurements associated with the coprocessor and/or a virus data store. The method may further include executing a process that includes a quarantine of the malware, a removal of the malware, a transmission to a user of a communication associated with the malware, and/or another transmission to a virus checker's manufacturer of a report associated with the malware, in response to detecting a suspicious behavior associated with the FPGA from the scan that identifies the malware within the FPGA.

According to further embodiments, the method may include adding a measurement coprocessor at the FPGA to measure at least one of the voltages. The method may further include forming the measurement coprocessor with a ring oscillator and a counter, forming the ring oscillator by an odd number of inverters coupled in a feedback loop in which a final output of the feedback loop is a logical NOT of a first input, causing the ring oscillator to oscillate from a feedback caused by the final output asserted in a finite amount of time after the first input, detecting an oscillation frequency of the ring oscillator, and converting an oscillation period divided by a time value associated with the oscillation period to the voltage divided by the time value.

According to other examples, a computing device to detect a malware at a field programmable gate array (FPGA) through voltage measurements of the FPGA may include a memory configured to store instructions and a controller coupled to the memory and configured to execute a malware detection module in conjunction with the stored instructions. The malware detection module may be configured to initiate a scan of the FPGA for the malware, measure voltages in distinct areas within the FPGA, create a power map from the voltages, retrieve an expected activity information associated with the FPGA from a configuration controller, and execute the scan based on a comparison of the power map to the expected activity information. An existing sensor on the FPGA and/or a new sensor positioned adjacent to the FPGA may be used to measure the voltages.

According to some embodiments, the malware detection module may be further configured to initiate the scan based on a condition of the FPGA that includes an inactivity of the FPGA and/or a partial inactivity of the FPGA and/or infer at least one of the voltages from a subset of the voltages. The malware detection module may be further configured to evaluate a power consumption by one of the distinct areas without a coprocessor and/or evaluate a power consumption by one of the areas with at least one inactive coprocessor.

According to other embodiments, the malware detection module may be further configured to evaluate a power consumption exceeding a predetermined threshold by a coprocessor of the FPGA and/or retrieve the predetermined threshold from a data store of prior measurements associated with the coprocessor and/or a virus data store. The malware detection module may be further configured to execute a process that includes a quarantine of the malware, a removal of the malware, a transmission to a user of a communication associated with the malware, and/or another transmission to a virus checker's manufacturer of a report associated with the malware, in response to detecting a suspicious behavior associated with the FPGA from the scan that identifies the malware within the FPGA.

According to further embodiments, the malware detection module may be further configured to add a measurement coprocessor at the FPGA to measure at least one of the voltages, where the measurement coprocessor may be built with a ring oscillator and a counter. The malware detection module may be further configured to form the ring oscillator by an odd number of inverters coupled in a feedback loop in which a final output of the feedback loop is a logical NOT of a first input, cause the ring oscillator to oscillate from a feedback caused by the final output asserted in a finite amount of time after the first input, detect an oscillation frequency of the ring oscillator, and convert an oscillation period divided by a time value to the voltage divided by the time value.

According to further examples, a computer-readable storage medium may store instructions to detect a malware at a field programmable gate array (FPGA) through voltage measurements of the FPGA. The instructions, when executed, may cause a method to be performed that includes initiating a scan of the FPGA for the malware based on a condition of the FPGA that includes an inactivity of the FPGA and/or a partial inactivity of the FPGA and measuring voltages in distinct areas within the FPGA using an existing sensor on the FPGA and/or a new sensor positioned adjacent to the FPGA. The method may further include creating a power map from the voltages, retrieving an expected activity information associated with the FPGA from a configuration controller, and executing the scan by comparing the power map to the expected activity information.

According to some embodiments, a first power consumption by a first area of the FPGA with no coprocessor may be evaluated and a second power consumption by a second area of the FPGA with at least one inactive coprocessor may be evaluated. A power consumption exceeding a predetermined threshold by a coprocessor may be evaluated, where the predetermined threshold may be retrieved from a data store of prior measurements associated with the coprocessor and a virus data store. The instructions may further include executing a process that includes a quarantine of the malware, a removal of the malware, a transmission to a user of a communication associated with the malware, and/or another transmission to a virus checker's manufacturer of a report associated with the malware, in response to detecting a suspicious behavior associated with the FPGA from the scan that identifies the malware within the FPGA.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations." without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to detect a malware of a field programmable gate array (FPGA) through voltage measurements of the FPGA, the method comprising:
    initiating a scan during an inactivity of the FPGA for the malware;
    measuring voltages of distinct areas that include at least one from a set of: an existing sensor within the FPGA or a new sensor positioned adjacent to the FPGA;
    creating a power map from the voltages;
    executing the scan by comparing the power map to an expected activity information associated with the FPGA; and
    evaluating whether a power consumption by a coprocessor of the FPGA exceeds a predetermined threshold, wherein the predetermined threshold is retrieved from a virus data store.

2. The method of claim 1, further comprising:
    inferring at least one of the voltages from a subset of the voltages.

3. The method of claim 1, further comprising:
    evaluating whether another power consumption by one of the distinct areas of the FPGA without a coprocessor exceeds the predetermined threshold.

4. The method of claim 1, further comprising:
    evaluating whether a further power consumption by one of the areas of the FPGA with at least one inactive coprocessor exceeds the predetermined threshold.

5. The method of claim 1, further comprising:
    retrieving the predetermined threshold from a data store of prior measurements associated with the coprocessor instead of the virus data store.

6. The method of claim 1, further comprising:
    in response to detecting a suspicious behavior associated with the FPGA from the scan that identifies the malware within the FPGA, executing a process that includes at least one from a set of: a quarantine of the malware, a removal of the malware, a transmission to a user of a communication associated with the malware, or another transmission to a virus checker's manufacturer of a report associated with the malware.

7. The method of claim 1, further comprising:
    adding a measurement coprocessor at the FPGA to measure at least one of the voltages.

8. The method of claim 7, further comprising:
    forming the measurement coprocessor with a ring oscillator and a counter;
    forming the ring oscillator by an odd number of inverters coupled in a feedback loop in which a final output of the feedback loop is a logical NOT of a first input;
    causing the ring oscillator to oscillate from a feedback caused by the final output asserted in a finite amount of time after the first input;
    detecting an oscillation frequency of the ring oscillator; and
    converting an oscillation period divided by a time value associated with the oscillation period to the voltage divided by the time value.

9. A computing device to detect a malware at a field programmable gate array (FPGA) through voltage measurements of the FPGA, the computing device comprising:
    a plurality of voltage measurement sensors configured to measure voltages in distinct areas within the FPGA;
    a configuration controller configured to load at least one coprocessor onto the FPGA;
    a memory configured to store instructions; and
    one or more processors coupled to the memory, wherein at least one of the one or more processors is configured to execute a malware detection module in conjunction with the stored instructions, the malware detection module configured to:
        initiate a scan during an inactivity of the FPGA for the malware by instructing the plurality of voltage measurement sensors;
        receive voltage measurement results from the plurality of voltage measurement sensors;
        create a power map from the received voltages;
        retrieve an expected activity information associated with at least one coprocessor loaded onto the FPGA from the configuration controller;
        complete the scan based on a comparison of the power map to the expected activity information; and
        evaluate whether a first power consumption by a first area of the FPGA without use of the coprocessor exceeds a predetermined threshold, wherein the predetermined threshold is retrieved from a virus data store.

10. The computing device according to claim 9, wherein the malware detection module is further configured to:
    infer at least one of the voltages from a subset of the voltages.

11. The computing device according to claim 9, wherein the malware detection module is further configured to:
evaluate whether a second power consumption by a second area of the FPGA with at least one inactive coprocessor exceeds the predetermined power threshold.

12. The computing device according to claim 9, wherein the malware detection module is further configured to:
retrieve the predetermined threshold also from a data store of prior measurements associated with the coprocessor.

13. The computing device according to claim 9, wherein the malware detection module is further configured to:
in response to detection of a suspicious behavior associated with the FPGA from the scan that identifies the malware within the FPGA, execute a process that includes at least one from a set of a quarantine of the malware, a removal the malware, a transmission to a user of a communication associated with the malware, or another transmission to a virus checker's manufacturer of a report associated with the malware.

14. The computing device according to claim 9, wherein the malware detection module is further configured to:
add a measurement coprocessor as the new sensor in the FPGA to measure one of the voltages, wherein the measurement coprocessor is built with a ring oscillator and a counter.

15. The computing device according to claim 14, wherein the malware detection module is further configured to:
form the ring oscillator by an odd number of inverters coupled in a feedback loop in which a final output of the feedback loop is a logical NOT of a first input;
cause the ring, oscillator to oscillate from a feedback caused by the final output asserted in a finite amount of time after the first input;
detect an oscillation frequency of the ring oscillator; and
convert an oscillation period divided by a time value to the voltage divided by the time value.

16. A non-transitory computer-readable storage medium with instructions stored thereon to detect a malware at a field programmable gate array (FPGA) through voltage measurements of the FPGA, the instructions, when executed, causing a method to be performed, wherein the method comprises:
initiating a scan of the FPGA for the malware based on a condition of the FPGA that includes an inactivity of the FPGA;
measuring voltages in distinct areas within the FPGA using at least one from a set of: an existing sensor on the FPGA or a new sensor positioned adjacent to the FPGA;
creating a power map from the voltages;
retrieving an expected activity information associated with the FPGA from a configuration controller;
executing the scan by comparing the power map to the expected activity information;
evaluating whether a first power consumption by a first area of the FPGA without use of a coprocessor exceeds a predetermined power threshold, wherein the predetermined threshold is retrieved from a virus data store; and
evaluating whether a second power consumption by a second area of the FPGA with use of at least on inactive coprocessor exceeds the predetermined power threshold.

17. The non-transitory computer-readable storage medium according to claim 16, wherein the predetermined threshold is further retrieved from a data store of prior measurements associated with the coprocessor.

18. The non-transitory computer-readable storage medium according to claim 16, wherein the instructions further include:
in response to detecting a suspicious behavior associated with the FPGA from the scan that identifies the malware within the FPGA, executing a process that includes at least one from a set of: a quarantine of the malware, a removal of the malware, a transmission to a user of a communication associated with the malware, or another transmission to a virus checker's manufacturer of a report associated with the malware.

\* \* \* \* \*